United States Patent [19]

Browning

[11] 4,188,052
[45] Feb. 12, 1980

[54] LINE THREADING AND CUTTING DEVICE

[76] Inventor: Charles W. Browning, 4645 E. 57th St., Tulsa, Okla. 74135

[21] Appl. No.: 932,567

[22] Filed: Aug. 10, 1978

[51] Int. Cl.² ............................................. D04G 5/00
[52] U.S. Cl. ...................................... 289/17; 30/241
[58] Field of Search ................... 289/17; 81/418, 419, 81/425 R, 425 A, 43; 30/113, 241

[56] References Cited

U.S. PATENT DOCUMENTS

| | | | |
|---|---|---|---|
| 1,623,044 | 4/1927 | Butcher et al. | 30/241 X |
| 1,706,581 | 3/1929 | McFarland | 30/113 X |
| 2,926,036 | 2/1960 | Wimberley | 289/17 |
| 4,029,346 | 6/1977 | Browning | 289/17 |

FOREIGN PATENT DOCUMENTS 887711  8/1953  Fed. Rep. of Germany ............ 30/113

*Primary Examiner*—Louis Rimrodt

[57] ABSTRACT

A line threading and cutting device useful for threading, knotting, sizing and tying a line to an eyelet of a lure and hook comprising an enclosure case having an indentation and a line retainer and release mechanism for holding the said line in a looped position over the surface of the said enclosure case so as to form a knot in the said line attached to an eyelet of a lure; the said enclosure case having an assembly of components mounted therein including a spring clamp aligned with a line guide means in the said case in combination for holding the eyelet lure and hook; a single cutting blade in assembly with a backup plate, with means for sliding the said cutting blade in a scissor movement against the edge of the said backup plate and a spring loaded line release having an indentation for holding the said looped line.

7 Claims, 8 Drawing Figures

LINE THREADING AND CUTTING DEVICE

A device for holding a lure and hook eyelet to enable the threading and knotting of a fishing line through the said eyelet comprising an outer shell case having means for holding the said line wound around the outer shell case, means to hold the said eyelet and means to guide the said line through the said eyelet; means to release the said line wound around the said shell case and means to cut the said line.

BACKGROUND OF THE INVENTION

Reference is made to my U.S. Pat. No. 4,029,346, issued June 14, 1977 to myself, Charles W. Browning, which disclosed a line threading device with a different structure than the device shown in the application. The structure of the device shown in U.S. Pat. No. 4,029,346, cited above does not have the improvements, refinements and ease of operation as will be shown in my improved line threading and cutting device described in my present application. The present application provides apparatus for easily forming a knot and for threading an eyelet of a lure or hook with greater ease. The method of cutting the line is by an improved cutting means and the improved structure of the means to guide the line through the eyelet will become apparent from the following disclosure.

OBJECT OF THE INVENTION

The principal object of this invention is to disclose a new and improved device made of a combination of elements to aid a fishing person to speedily with ease, attach a line through the eyelet of a hook and lure.

Another object of this invention is to disclose a combination of elements assembled so as to easily loop line over the outer case structure with positive control in forming and tying a line into a knot to hold the line to the eyelet of a lure.

Still another object of this invention is to disclose means for sizing and cutting the knotted line.

SUMMARY OF THE INVENTION

The fishing aid device which is described in this disclosure will provide fishing people with a combination of means to thread and knot the modern monofilament line through an eyelet of a lure or hook with greater ease. The device comprises in combination, means to thread; means to form the line in a looped fashion which can easily be pulled over the case surface to form a knot in the line thus securing the line in a fixed position to the eyelet of a lure or hook. Means are also provided to trim, cut and size the line to proper length. Means to remove excessive paint from the eyelets usually present when the lures are first used is also provided in my invention. The unique combination of the assembled components shall become apparent from the disclosure herein.

BRIEF DESCRIPTION OF DRAWINGS

FIG. 6 is the body configuration of a section of the enclosure case that the lifting means shown in FIGS. 4 and 5 rests in.

DESCRIPTION OF THE PREFERRED EMBODIMENT

Figure 1:
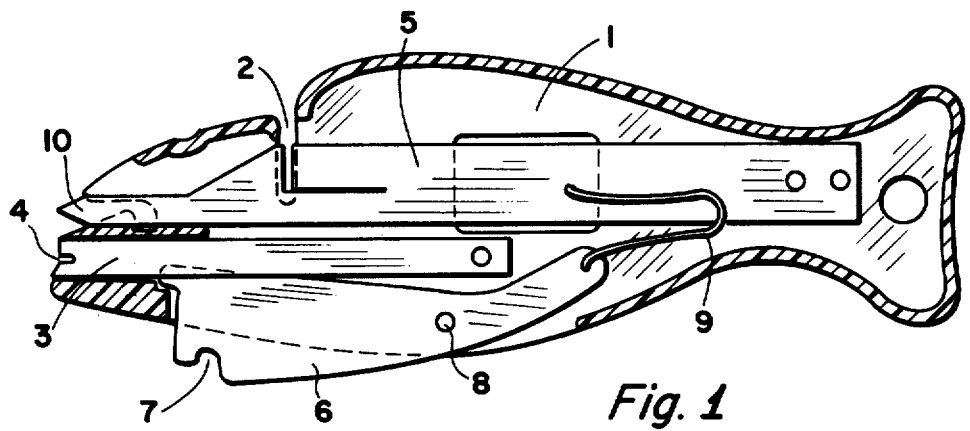
FIG. 1 is a crossectional view of the Line Threading and Cutting Device showing the general internal structure of the device.
Figure 2:
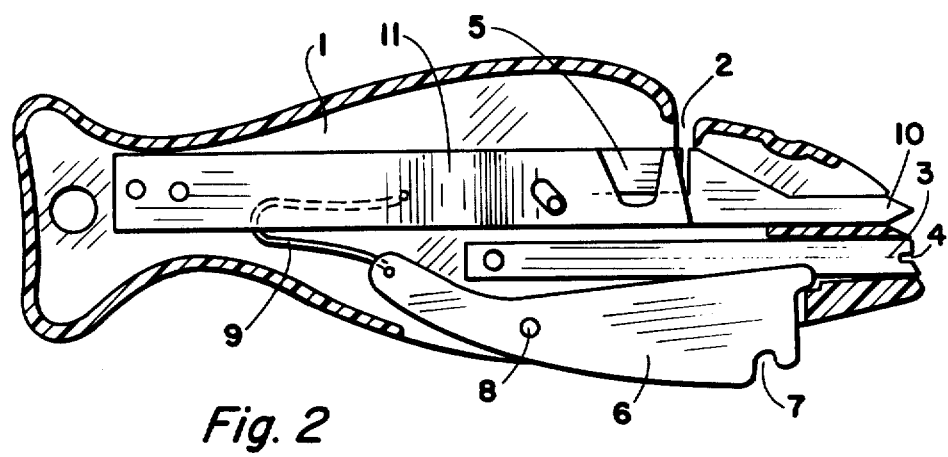
FIG. 2 is a crossectional view of the Line Threading and Cutting Device turned in reverse direction to show the internal structure of the Line Threading and Cutting Device from an alternate position.
Figure 3:
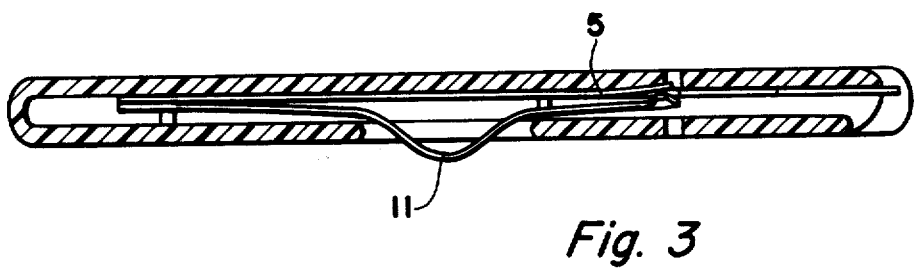
FIG. 3 is a crossectional view taken from the top of the Line Threading and Cutting Device showing the cutting means in assembly.
Figure 4:
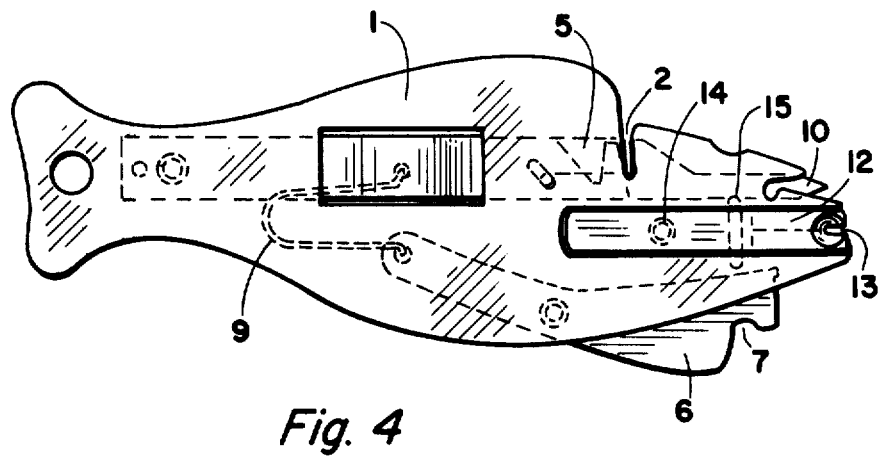
FIG. 4 is a crossectional view of the Line Threading and Cutting Device showing the adaption of a lifting means to aid in placing a large eyelet of a lure into position for threading.
Figure 8A:
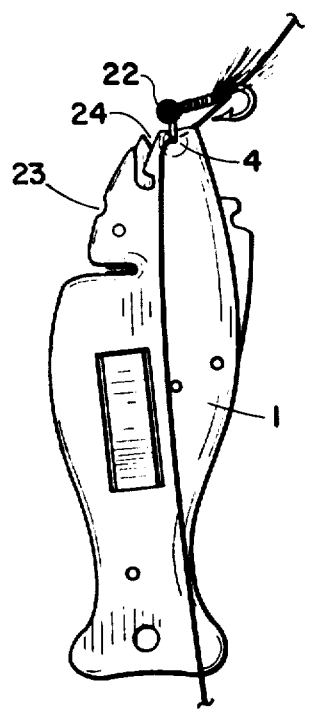
FIGS. 8A through 8C illustrates the various steps of threading a line through a Line Threading and Cutting Device for securing the eyelet of a lure to a fishing line.
Figure 8B:
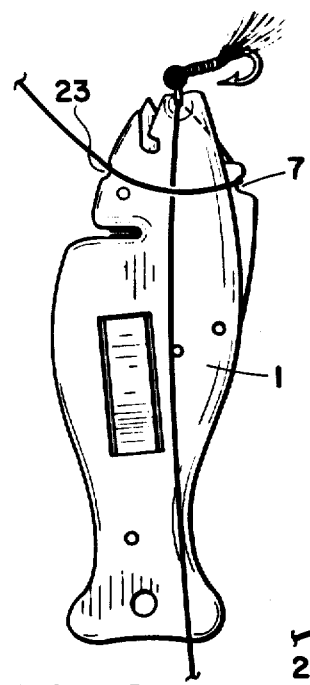

Reference is made to FIG. 1 which illustrates the general structure of the components which make the Line Threading and Cutting Device, FIG. 1. The shell enclosure case which is made from plastic moulded into the shape of a fish has means incorporated therein to secure the various components in place as illustrated in FIG. 1, 2 and 3. The line cutter component which is shown in a crossectional view as 5, FIG. 1, is riveted together; their operation will be explained in conjunction with FIG. 3. Pressure plate 3, FIG. 1 is necessary as a support plate for holding an eyelet of a lure and is used in conjunction with line guide 4, FIG. 1. Various structural types of line guides 4, FIG. 1, shown are A, B, C and D, FIG. 7, and line guide 13, FIG. 4 is shown structural as E and F at FIG. 7. All of these line guides are aligned with a pressure plate 3, FIG.1, in such a manner as to provide means to hold the eyelet of a hook or lure in place for threading. Pressure plate 3 is not shown in FIg. 4 but is identically located in FIG. 4 as it is shown in FIG. 1. The line cutter component 5 is also provided with a sharp point 10 which is useful to remove excessive paint from the eyelets of lures. A spacing slot for measuring and cutting the line is provided at 2, FIG. 1. A Line release lever 6, FIG. 2, which is pivotally mounted at 8 and moves in a plane surface is activated by spring 9. Slot 7 and indentation 23, FIG. 8B provides a means to hold and position the line around the shell enclosure case of the Line Threading and Cutting Device 1, FIGS. 8, A, B, C and D.

Reference is made to FIG. 2 which is a crossectional view of the Line Threading and Cutting Device in a reverse position. The structural parts that make up the device are similar to those parts shown in FIG. 1 but are shown in reverse order. This drawing reflects the position of the line release lever 6 in relation to pressure plate 3 and the position of the components as illustrated in FIG. 1. To assemble the shell enclosure case 1 of the Line Threading and Cutting Device as shown in FIG. 2, the shell enclosure case 1 FIG. 2 is placed on the shell enclosure case 1, FIG. 1, to form the complete unit as illustrated in FIGS. 8, A through E.

Reference is made to FIG. 3 which illustrates a crossectional view of the line cutting feature of my invention looking at it from the top surface. The line cutting feature is made up of a support blade and a cutting blade 11 to form as a unit. The upper blade as shown is slotted (note FIG. 1) and is useful for guiding the line to be cut into position at 2, FIG. 1. The cutting action is activated by pressing on the lower blade at 11, FIG. 3.

Reference is made to FIG. 4 which illustrates another species of the Line Threading and Cutting Device. The shell enclosure case 1 is shown with component 2, 5, 6, 7, 9, 10, 12 and 13 in position. The components which are similar to those shown in FIG. 1, have been identified in FIG. 1, 2 and 3 except for 12, 13, 14 and 15 which make up the lifting lever shown as 12, FIG. 4. Reference is made to FIG. 7, E and F which is a type of threading guide means 13, FIG. 4, which is used in conjunction with lifting lever 12, FIG. 4. Component 12, FIG. 4, which is a lifting lever is mounted into a shell 1 on a hinge pin at position 15 supported by a spring positioned at 14 which enables a fisherman to raise the threading guide 13 to enable the placement of a large eyelet of a lure or hook into threading position under the threading guide 13.

Figure 5:
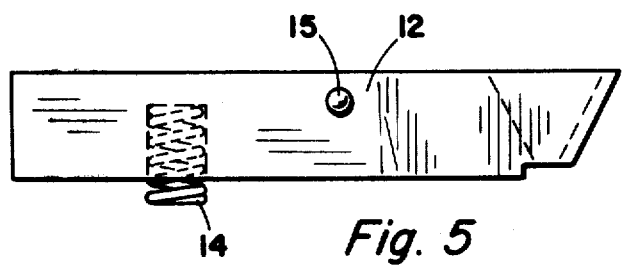
FIG. 5 is a crossectional view of the lifting means shown in FIG. 4.

FIG. 5 is a crossectional view of lifting lever 12, FIG. 4, showing spring 14 and mounting hinge pin 15.

Figure 6:
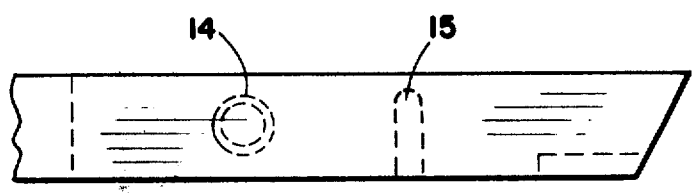
Figure 7A:
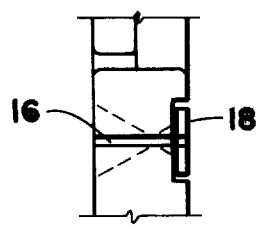
FIGS. 7A through 7F is a crossectional view of the various types of configurations of the threading means in the enclosure case which are useful in the Line Threading and Cutting Device.
Figure 7B:
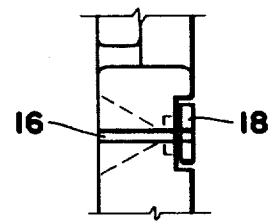
Figure 7C:
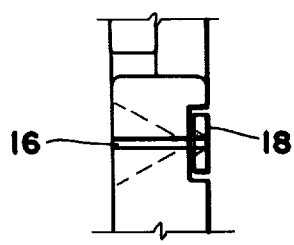
Figure 7D:
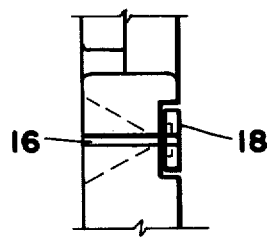
Figure 7E:
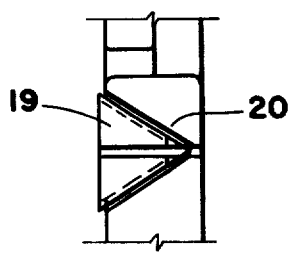
Figure 7F:
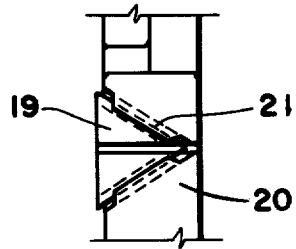

FIG. 6 is a top crossectional view of the lifting lever 12, FIG. 4, showing the positioning of spring 14 and the position of mounting hinge pin 15.

Reference is made to FIGS. 7, A, B, C, D, E and F which are partial crossectional structural front views showing the structure of various types of threading guides which can be used in my Line Threading and Cutting Device. These threading guides are part of the enclosure shell 1 (See 4, FIG. 8). FIG. 7 A illustrates line threading guide means with the top side conical in shape and extending downwardly with channel 16 and flares out at the base into a small conical cone against pressure plate 18 shown as 3, FIG. 2 which is bevelled at the front edge to accomodate easy insertion of the lure 22, eyelet for easy threading, FIG. 8 A. FIG. 7 B is another variation of the structure shown in FIG. 7 A with the opening flaring into a round indentation instead of the conical shape shown in FIG. 7 A. FIG. 7 C is a further structural modification of FIG. 7 A. In this variation the pressure plate 18 is shown with a sloping channel to aid the placement of the eyelet of a lure in threading position under the line threading guide 4, FIG. 8 A. FIG. 7 D shows still a further modification of the pressure plate 18 with a groove milled therein. FIG. 7 E shows another modification of the guiding means 19 which fits into a V-shaped base 20. In this application guiding means 19 is part of the lifting lever 12, FIG. 4 and is shown as 13, FIG. 4. FIG. 7F is a modification of FIG. 7E. In this modification the V-shaped base 20 edge 21 is partially flared with provision at the lower extremity to provide for placement of the shank of a lure or hook. The flared edge 21 prevents the eyelet of a lure or hook from slipping out during the line threading operation.

Reference is made to FIGS. 8, A, B, C, D and E which illustrates the different steps of attaching a line to lure by using the Line Threading Device as disclosed herein. FIG. 8A shows the positioning of the line through the threading guide 4 which holds the eyelet of lure 22. The line is now passed through slot 7, FIG. 8B over the shell enclosure case 1 of the device across groove 23. The line is wound around the shell enclosure case 1 of the device a second time and passed over slot 7 and groove 23 as shown in FIG. 8C. The line is then passed again around the shell enclosure case 1 of the device and hooked at position 24. Lever 6 is then depressed, the line is released at 7 and 23 and the lure 22 is pulled in an upward position to form a tight knot thus securing the lure to the line.

Figure 8E:
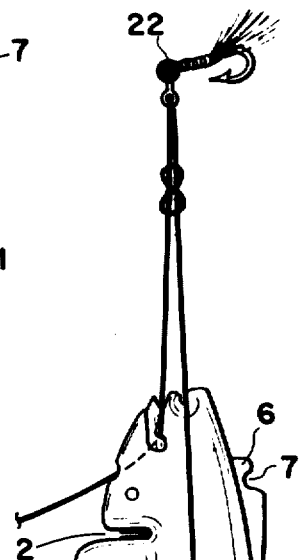
Figure 8C:
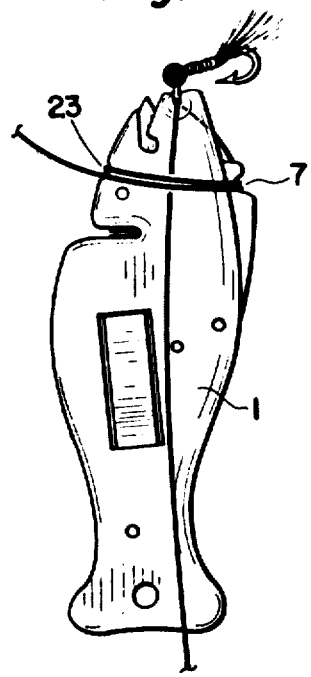
Figure 8D:
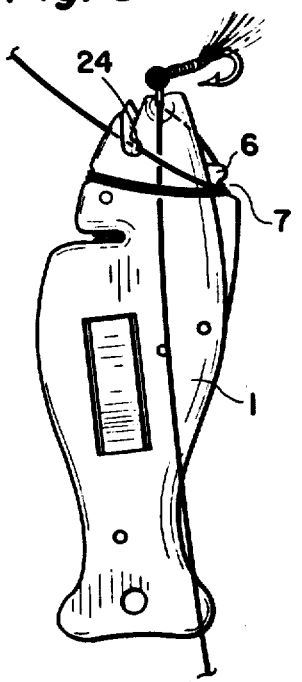

To size the amount of line left on the lure, the line to be cut is then placed at position 2, FIG. 8E. Line cutting blade 5, FIG. 1 is moved forward by pressing at position 11, FIG. 3 to produce a scissor effect, the cutting blade will sever the line at position 2.

Although I have described only a typical preferred form and application of myinvention, the invention should not be limited or restricted to specific details herein set forth, but I wish to reserve to myself any variations that may fall into the scope of the following claims.

I claim:

1. An improved Line Threading and Cutting Device comprising an enclosure case, the said enclosure case having a gauge slot and a groove in the outer structure; the said enclosure case having means therein suitable for mounting;
    (a) a lure holder with means for threading a line through an eyelet of a lure,
    (b) a double blade assembly,
        (1) the first said blade being slotted and aligned with the said gauge slot in the said enclosure, the said blade assembly being mounted in a stationary position within the said enclosure case;
        (2) the said second blade being attached to the said first blade and slidably mounted with means to move the said second blade over the said first blade, the end of the said second blade moving over the said slot in the first said blade to form a cutting edge;
    (c) a spring loaded lever pivotally mounted in the said enclosure case for releasing a line looped over the said enclosure case, the said line passing over the said groove in the said enclosure case and over a slot in the said spring loaded lever, the said line being released to form a knot so as to secure the said line to said lure.

2. The improved Line Threading and Cutting Device as claimed in claim 1 where the first and second blade in the said double blade assembly is positioned in relationship to each other so as to cut the said line precisely to the end of the said knot with a minimum of overhand of line.

3. The improved Line Threading and Cutting Device as claimed in claim 1 where the said blade in the said double blade assembly has a pointed end useful for removing excessive paint from the said eyelets of a lure.

4. The improved Line Threading and Cutting Device as claimed in claim 1 where the said lure holder means is a line guide with the top side conical in shape, the said guide extending downwardly and flaring out at the base first into a small conical opening, through an eyelet of a lure.

5. The improved Line Threading and Cutting Device as claimed in claim 1 where the said lure holder with means for threading a line through an eyelet of a lure, is spring supported and pivotally mounted in the said enclosure case.

6. The improved Line Threading and Cutting Device as claimed in claim 5 where the said line holder guide means for threading a line through an eyelet of a lure is a two sectioned opening, the first upper section being V-shaped, movably mounted and extending downwardly to nest into a second V-shaped section, the said second V-shaped section being in a fixed position.

7. The improved Line Threading and Cutting Device as described in Claim 6 where the side of the said second V-shaped section is flanged on each side of the opening so as to hold the said eyelet of the lure firmly in position in the said guide means.

* * * * *